United States Patent
Lorrain-Hale et al.

(10) Patent No.: US 11,328,004 B2
(45) Date of Patent: May 10, 2022

(54) METHOD AND SYSTEM FOR INTELLIGENTLY SUGGESTING TAGS FOR DOCUMENTS

(71) Applicant: MICROSOFT TECHNOLOGY LICENSING, LLC, Redmond, WA (US)

(72) Inventors: Theo Lorrain-Hale, Cambridge, MA (US); Patrick Michael Gan, Salem, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 16/362,524

(22) Filed: Mar. 22, 2019

(65) Prior Publication Data

US 2020/0301950 A1    Sep. 24, 2020

(51) Int. Cl.
| | | |
|---|---|---|
| *G06F 16/33* | (2019.01) | |
| *G06F 16/332* | (2019.01) | |
| *G06F 16/93* | (2019.01) | |
| *G06F 16/21* | (2019.01) | |
| *G06F 16/338* | (2019.01) | |
| *G06F 40/169* | (2020.01) | |
| *G06F 40/117* | (2020.01) | |
| *G06F 3/0482* | (2013.01) | |

(52) U.S. Cl.
CPC ........ *G06F 16/3323* (2019.01); *G06F 3/0482* (2013.01); *G06F 16/219* (2019.01); *G06F 16/338* (2019.01); *G06F 16/93* (2019.01); *G06F 40/117* (2020.01); *G06F 40/169* (2020.01)

(58) Field of Classification Search
CPC .... G06F 16/3323; G06F 16/93; G06F 16/219; G06F 16/338; G06F 40/169; G06F 40/117; G06F 3/0482
USPC ......................................................... 715/255
See application file for complete search history.

(56) References Cited

U.S. PATENT DOCUMENTS

| | | | |
|---|---|---|---|
| 7,636,732 B1 * | 12/2009 | Nielsen .............. | G06F 16/3322 |
| 9,305,084 B1 | 4/2016 | Mccann et al. | |
| 10,684,738 B1 * | 6/2020 | Sicora .................. | G06F 16/435 |
| 2009/0094231 A1 * | 4/2009 | Marvit ................. | G06F 16/313 |
| 2010/0070851 A1 * | 3/2010 | Chen ...................... | G06F 40/14 |
| | | | 715/236 |
| 2012/0016885 A1 | 1/2012 | Jin et al. | |

(Continued)

OTHER PUBLICATIONS

"International Search Report and Written Opinion Issued in PCT Application No. PCT/US2020/022513", dated May 25, 2020, 10 Pages.

*Primary Examiner* — Hope C Sheffield
(74) *Attorney, Agent, or Firm* — NovoTechIP International PLLC

(57) ABSTRACT

A method and system for providing keyword suggestions to a user of a document during use of the document, the keyword suggestions being made to enable selection of the keywords as tags for the document. The method includes examining contents of a document, identifying a keyword related to the document based at least in part on the contents of the document, displaying the keyword on a user interface element relating to the document to enable a user to choose to add the keyword as a tag associated with the document, receiving an input indicating a user's approval of the keyword, and upon receiving the input, associating the keyword with the document as a tag.

16 Claims, 10 Drawing Sheets

(56) References Cited

U.S. PATENT DOCUMENTS

| | | | |
|---|---|---|---|
| 2014/0281877 A1* | 9/2014 | Burge | G06F 16/958 |
| | | | 715/230 |
| 2016/0063022 A1 | 3/2016 | Voronkov et al. | |
| 2016/0179899 A1* | 6/2016 | Lim | G06F 16/24575 |
| | | | 707/748 |
| 2016/0188686 A1* | 6/2016 | Hopkins | G06F 16/93 |
| | | | 707/602 |
| 2016/0269334 A1* | 9/2016 | DeSouza Sana | G06Q 10/107 |
| 2018/0060347 A1 | 3/2018 | Bhattacharjee | |
| 2019/0146647 A1* | 5/2019 | Ramchandran | G06Q 30/016 |
| | | | 715/758 |

* cited by examiner

US 11,328,004 B2

METHOD AND SYSTEM FOR INTELLIGENTLY SUGGESTING TAGS FOR DOCUMENTS

TECHNICAL FIELD

This disclosure relates generally to intelligent tagging of documents, and, more particularly, to a method of and system for intelligently identifying and suggesting tags for documents.

BACKGROUND

With the significant number of electronic documents created and implemented by computer users, it has become increasingly difficult to locate a desired document and information. This is particularly true in organizations that include many computer users, as most enterprise users have access to a vast number of computer files. Currently search capabilities offered by file systems often either search for file names and/or within contents of a file. Searches of file names often result in a limited number of search results, as this is a very limited field to search. Searching of contents, on the other hand, can result in numerous results through which the user may need to comb to locate the desired information. Annotating documents with tags may eliminate these issues by associating each document with appropriate keywords that highlight the most relevant features of a document. However, currently used tagging systems utilized by computer systems such as search engines and databases are often inefficient and may not always find the most relevant keywords.

Hence, there is a need for improved systems and methods of intelligently annotating a document with tags.

SUMMARY

In one general aspect, the instant application describes a device having a processor and a memory in communication with the processor where the memory stores executable instructions that, when executed by the processor, cause the device to perform multiple functions. The function may include examining contents of a document, identifying a keyword related to the document based at least in part on the contents of the document, displaying the keyword on a user interface element relating to the document to enable a user to choose to add the keyword as a tag associated with the document, receiving an input indicating a user's approval of the keyword, and upon receiving the input, associating the keyword with the document as a tag.

In yet another general aspect, the instant application describes a method providing tag suggestions for a document to a user of the document during the use of the document where the method includes the steps of examining contents of a document, identifying a keyword related to the document based at least in part on the contents of the document, displaying the keyword on a user interface element relating to the document to enable a user to choose to add the keyword as a tag associated with the document, receiving an input indicating a user's approval of the keyword, and upon receiving the input, associating the keyword with the document as a tag.

In a further general aspect, the instant application describes a non-transitory computer readable medium on which are stored instructions that when executed cause a programmable device to examine contents of a document, identify a keyword related to the document based at least in part on the contents of the document, display the keyword on a user interface element relating to the document to enable a user to choose to add the keyword as a tag associated with the document, receive an input indicating a user's approval of the keyword, and upon receiving the input, associate the keyword with the document as a tag.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
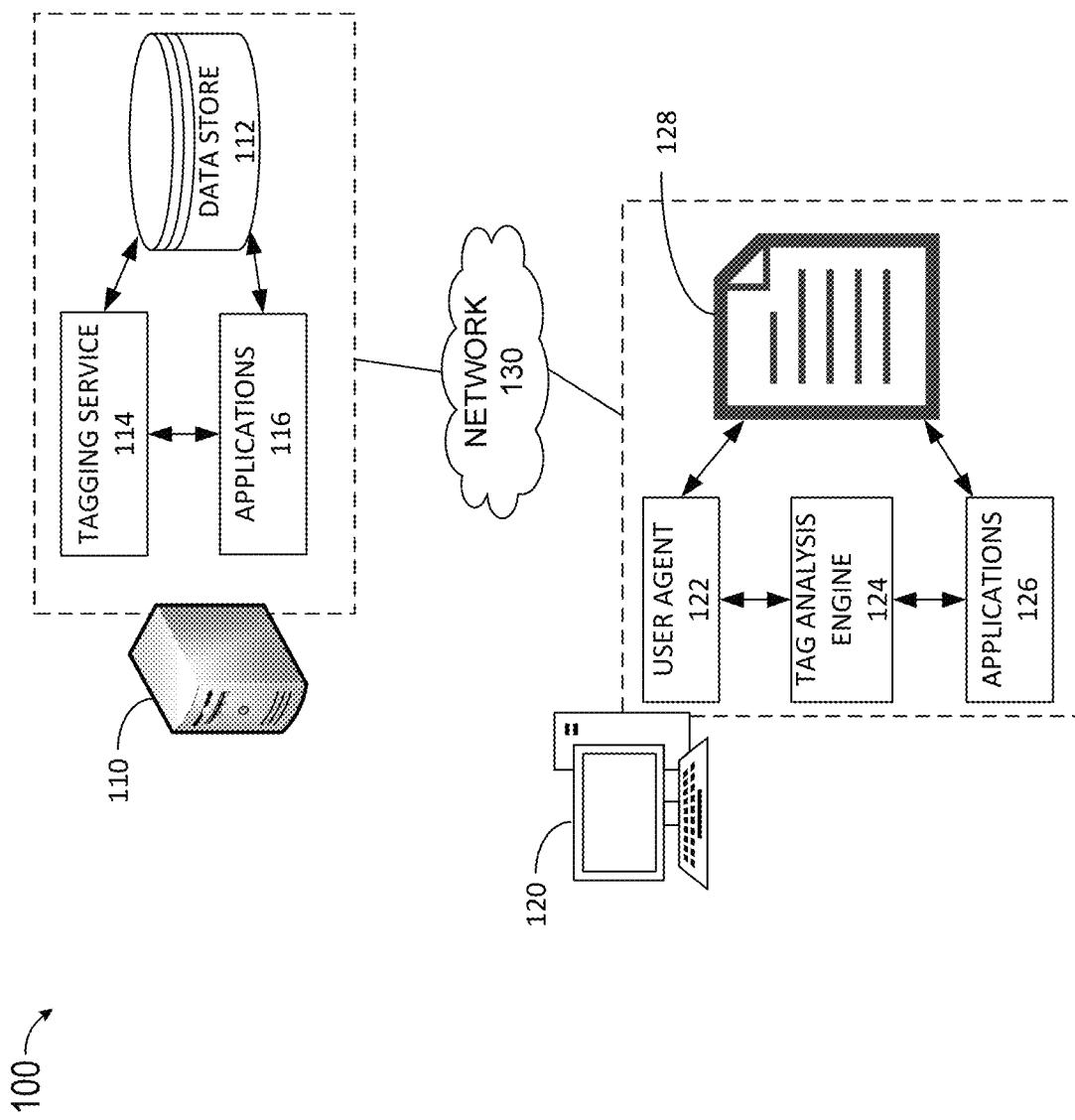
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Annotating documents by associating one or more keywords that describe the contents of a document can be useful in several different ways. The keywords can be used to make recommendations to users, they can be used as descriptors when providing a list of documents to choose from (e.g., a list of files in a file directory), or they can be utilized in more efficient searching and providing more accurate search results. Currently used tagging engine systems such as search engines often conduct automatic tagging without confirming the accuracy of the tags with a user. This is primarily because search engines tag documents after they have been created and saved in a data store. This may not always result in the most accurate tags since users, and particularly authors of documents are the best resource in determining the correct keywords associated with a document.

Some currently used applications that generate documents provide options for a user to add one or more tags to a document, but these options are often underutilized as they are not user friendly and often not well-known by average users. For example, some word processing applications provide an option for a user to tag a document when utilizing a "save as" option. To do so, however, the user would need to save the document in a new file and would be required to think of keywords associated with the document and remember to add them. This is inconvenient and time consuming and as a result rarely used.

To address these issues and more, in an example, this description provides techniques used for intelligently suggesting keywords to annotate a document with while the document is being utilized by a user. To do so, techniques may be used to examine the contents, context, formatting and/or other characteristics of the document to provide suggested keywords to the user to select from. In one implementation, the suggested keywords are displayed in a user interface alongside the document to enable the user to view and access them conveniently. Additionally, techniques may be used to examine a user's history to identify appropriate keywords. The user's history may include previous tags added to documents, previous suggestions declined, or tags added to similar documents of the user (e.g., documents having similar topic, similar formatting, and the like). To further improve identification of relevant keywords, tagging history of similar users within the organization, similar files within a file directory or pertinent global users may be examined. The user may then have the ability to review the list of suggestions and approve the most appropriate ones to add as tags to the document. As a result, the solution provides an improved method of easily allowing a user to review and approve intelligently suggested keywords to add as tags to a document.

As will be understood by persons of skill in the art upon reading this disclosure, benefits and advantages provided by such implementations can include, but are not limited to, a solution to the technical problems of inefficient and inaccurate tagging of documents. Technical solutions and implementations provided here optimize the process of tagging a document for a user by providing an easily accessible user interface element which contains a list of intelligently suggested keywords to choose from, thus eliminating the need for the user to come up with their own terms, and yet providing the user an opportunity to be the decision maker as to which keywords become associated with the document thus increasing accuracy and relevancy. The benefits provided by these solutions provide more user-friendly applications, increase accuracy and increase system and user efficiency.

FIG. 1 illustrates an example system 100, upon which aspects of this disclosure may be implemented. The system 100 may include a sever 110 which may be connected to or include a data store 112 which may function as a repository in which documents and/or data relating to document tagging may be stored. The server 110 may operate as a shared resource server located at an enterprise accessible by various computer client devices such as client device 120. The server may also operate as a cloud-based server for offering global tagging services.

The server 110 may include and/or execute a tagging service 114 which may provide intelligent tagging within an enterprise and/or globally for a group of users. The tagging service 114 may operate to examine content, context and tagging history of documents to intelligently suggest one or more keywords. In one implementation, the tagging service is a cloud-based service. The server 110 may also include or be connected to one or more online applications 116 that provide access to or enable creation and/or editing of one or more documents.

The client device 120 may be connected to the server 110 via a network 130. The network 110 may be a wired or wireless network(s) or a combination of wired and wireless networks that connect one or more elements of the system 100. The client device 120 may be a personal or handheld computing device having or being connected to input/output elements that enable a user to interact with an electronic document 128 on the client device 120. Examples of suitable client devices 120 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail in regard to FIGS. 5 and 6.

The client device 120 may include one or more applications 126. Each application 126 may be a computer program executed on the client device that configures the device to be responsive to user input to allow a user to interactively view, generate and/or edit the electronic document 128. The electronic document can include any type of data, such as text, still images, video and audio. The application 126 may process the electronic document, in response to user input through an input device, to create and/or modify the content of the electronic document, by displaying or otherwise presenting display data, such as a graphical user interface which includes the content of the electronic document to the user. Examples of suitable applications include, but are not limited to, a word processing application, a presentation application, a note taking application, a text editing application, a paint application, an image editing application, a spreadsheet application, a desktop publishing application, a drawing application, a video editing application, and an audio editing application.

In some examples, applications used to create, modify and/or view content and tagging information of an electronic document maybe online applications such as applications 116 that are run on the server 110 and provided via an online service as described above. In one implementation, web applications may communicate via the network 130 with a user agent 122, such as a browser, executing on the client device 120. The user agent 122 may provide a user interface that allows the user to interact with application content and electronic documents stored in the data store 112. The user interface may be displayed on a display device of the client device 120 by utilizing for example the user agent 122. In some examples, the user agent 122 may be a dedicated client application that provides a user interface and access to electronic documents stored in the data store 112. In other examples, applications used to create, modify and/or view content and tagging information of an electronic document maybe local applications such as the applications 126 that are stored and executed on the client device 120, and provide a user interface that allows the user to interact with application content and electronic document 128.

Figure 2:
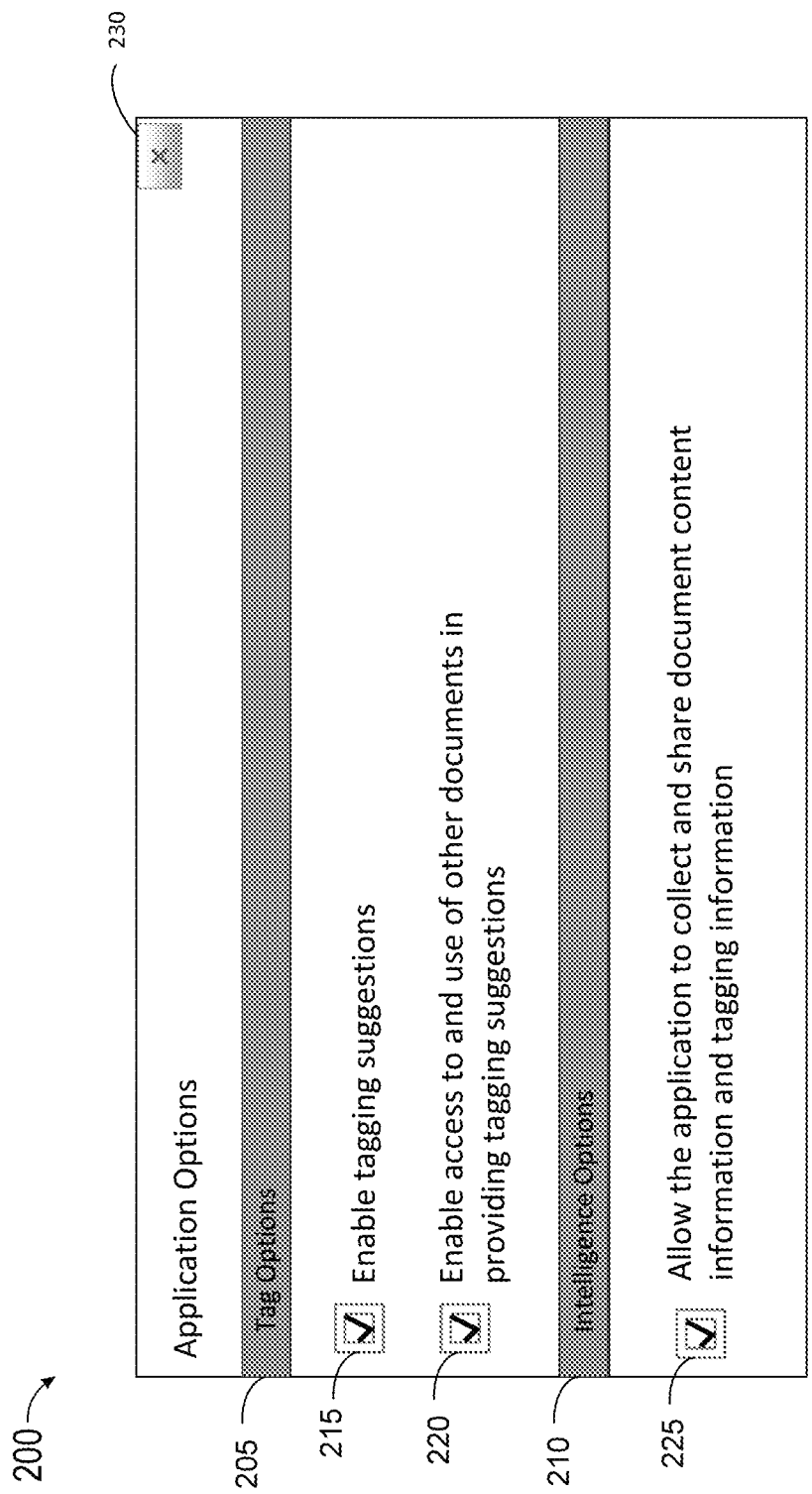
FIG. 2 is an example graphical user interface (GUI) screen for displaying a menu options that allow a user to enable/disable various tagging options for a document.

FIG. 2 illustrates an example graphical user interface (GUI) screen 200 displaying menu options 205 and 210 for allowing a user to enable/disable various tagging options in an application. In one implementation, the screen 200 may be an optional menu provided for one or more applications that create or edit documents. Screen 200 may be accessible as part of features provided for customizing an application via a GUI displayed by the application when the user selects an options menu button. In some examples, the application options may be accessible when a document is opened using the application.

To enable users to choose how and when to tag a document, application options may include tag options 205 and intelligence options 210. Tag options may provide a checkbox 215 for enabling automatic tagging suggestions and a checkbox 220 for enabling access to and use of other documents in providing keywords for tagging suggestions. Selecting checkbox 215 may enable the application to make use of the tagging engine or the tagging server to automatically provide keyword suggestions for tagging the document. This may function similar to an on and off button to turn on/off automatic suggestion of keywords during document use. This allows the user to choose whether they desire to receive automatic suggestions when they are viewing or working on a document. For example, some users may find the automatic suggestions distracting. Other times, users may desire to keep the contents of a document confidential and as such may not wish to tag the document with keywords. Checkbox 215 may allow the user to choose not to receive automatic suggestions in such instances.

Selecting checkbox 220 may enable the user to decide if other documents should be used to provide tagging suggestions for the document at hand. In some examples, users may desire to only examine the contents of the document at hand to receive tagging suggestions. Checkbox 220 provides the option to customize the process of providing tagging suggestions as desired by the user. Other tagging options may also be provided in this pane. For example, options may be provided for selecting how and when to view the suggested keywords. In some examples, users may prefer to view the suggested keywords alongside the document. In other examples, users may choose to view the suggested keywords in the bottom of the document. Other times, users may desire to view the suggestions after they are done with the document as part of saving the document. Screen 200 may provide these options and more to the user to customize their tagging experience.

GUI screen 200 also includes an intelligence menu options 210 for choosing whether to share information relating to document content and tagging with other applications and devices. This may allow the user to decide whether information relating to their document can be used as usage history in machine learning algorithms that help suggest intelligent tags. This may be important to provide a user options with respect to the privacy of information contained in their documents. It should be noted that any information collected from documents and used or stored to assist with intelligent tagging suggestions would be collected in a way to ensure compliance with privacy laws that regulate data collection, use and storage, and ensure that personal information is used in accordance with privacy standards. Furthermore, the data collected may be used only purposes of training machine learning algorithms to provide better tagging suggestions. It should be noted that although checkboxes are shown in the GUI screen 200, other types of user interface elements may be used for enabling/disabling the various tagging and intelligence options. Once the user selects their desired tagging and intelligence options, they may close the GUI screen 200 by selecting a close button 230, in which case the application may display the main GUI screen showing the contents of the document may.

Figure 3A:
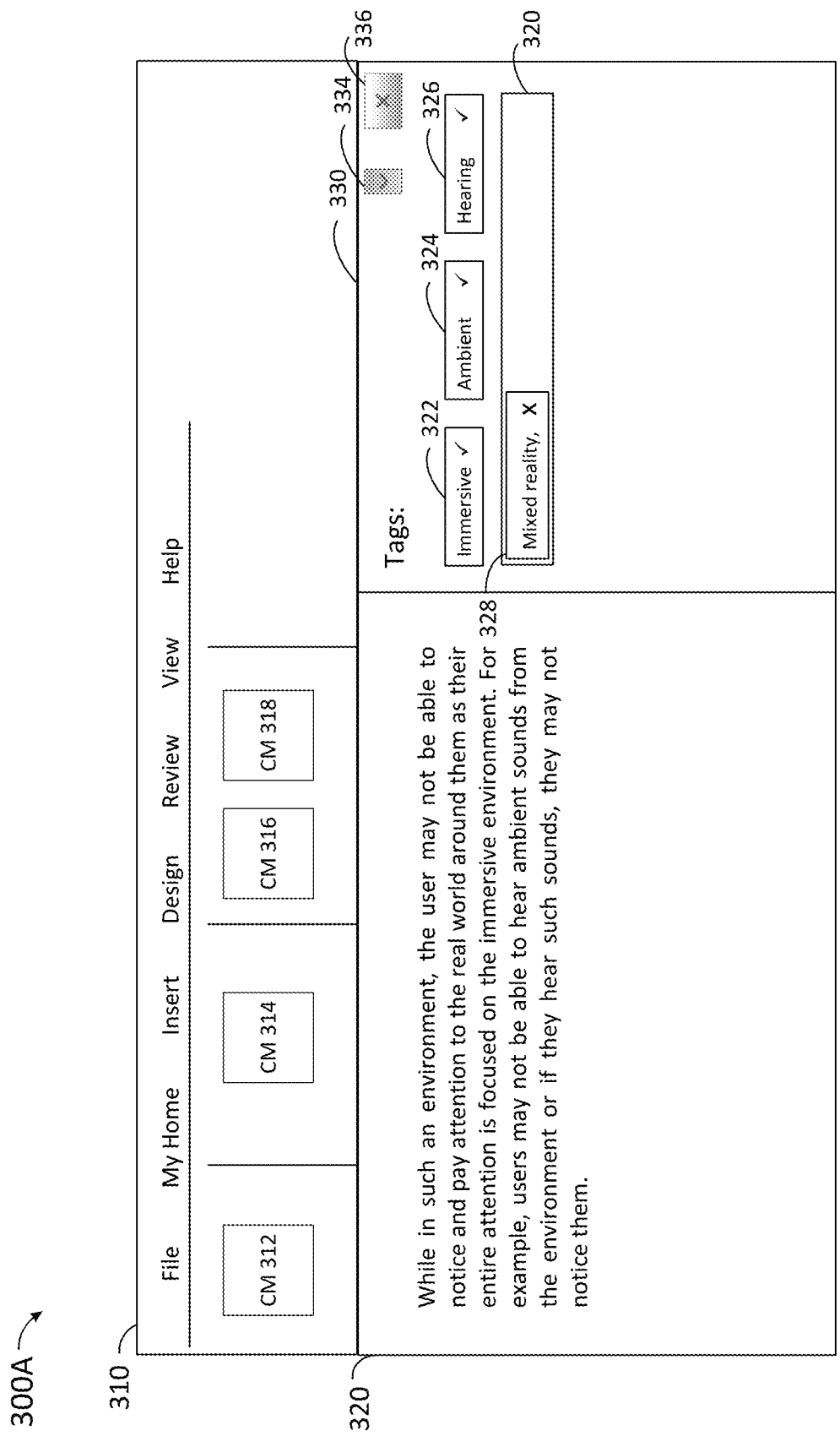
FIGS. 3A-3D are example GUI screens displaying various ways in which suggested keywords can be presented to a user of a document.

FIGS. 3A-3D are example GUI screens displaying various ways in which suggested keywords can be presented to a user of a document. FIG. 3A is an example GUI screen 300A of a word processing application (e.g., Microsoft Word®) displaying an example document. GUI screen 300A may include a toolbar menu 310 containing various tabs each of which may provide multiple command buttons such as CM 312, CM 314, CM 316, and CM 318. The toolbar menu may provide options for the user to perform one or more commands to create or edit the document. Screen 300A may also contain a contents pane 320 for displaying the content of the document. The contents may be displayed to the user for viewing and/or editing purposes and may be created by the user. In one implementation, as the user creates or edits the content in the content pane 320, a tagging pane 330 may be displayed alongside the content pane 320 to provide suggested keywords in real-time. This may assist the user to check for and approve suggested keywords as the user is working on the document. In this manner, while the subject of the document is fresh in the user's mind, he/she can review and approve suggested keywords to add as tags, thus eliminating the need to remember to add tags or approve suggested tags later. Being able to view the suggested keywords on the same screen, may also allow the user to compare the contents of the current page of the document with the keywords to determine the best tags for each page. As the user continues to add to the contents, more suggested tags may be displayed allowing the user to think about tags that represent the overall subject of the document.

Tagging pane 330 may display one or more suggested keywords such as keywords 322, 324 and 326, each of which may be approved by the user to be associated as a tag with the document by clicking for example on a checkmark displayed next to the keyword. Once approved, each keyword may be deselected by clicking on an x mark. Any other user interface element for displaying suggested keywords and enabling a user to approve/disapprove them may also be utilized in alternative embodiments. Tagging pane 330 may also include an input box 320 into which the user may be able to enter user determined tags such as tag 328 for the document. This may enable the user to enter his/her own identified keywords to be associated with the document in addition or in place of the ones suggested by the application. In one implementation, user identified phrases can be separated by a comma. For example, a user may enter a phrase into the input box 320. Ending the phrase with a comma may turn the phrase into a selectable keyword button such as the keyword button 328 which can be deleted by for example clicking on an x mark on the button. In this manner, the user can change the approved/entered keywords as changes are made to the document. If at some point during the process, the user decides that the tagging pane 330 is not useful for his/her purposes, the tagging pane 330 may be closed by selecting the close button 336. Subsequently, the dropdown button 334 may be selected to resurface the tagging pane 330. One or more of the command buttons CM 312, CM 314, CM 316, and CM 318 may also be used to display and/or close the tagging pane 330.

The list of suggested keywords displayed in the tagging pane 330 may be updated periodically based on a preset or changeable schedule. Furthermore, the list may be updated as the user creates and/or modifies the document. Still further, the list may be updated when the user clicks on a refresh button. The list of commands may also be updated based on a signal that indicates the user is switching tasks.

For example, the list of commands may be updated when the application determines that the user is now working on a table after entering text.

The tagging pane 330 may be invoked upon on a determination made by the application that the user is likely interested in viewing tagging suggestions and/or adding tags to the document and/or that the tagging pane would be the user's preferred method of displaying suggested keywords. This may be determined by examining a usage history of the user (e.g., determining that the user often adds tags to his/her documents or to documents having the same topic and/or format, etc. as the current document) or by examining certain user preselected preferences (e.g., the user enabled automatic tagging suggestions).

It should be noted that although tagging pane 330 is shown as being located adjacent to and on the right side of the GUI screen 300A, the tagging pane may be located anywhere within the GUI screen. In one implementation, the tagging pane may be a pop-up window. Any other method for displaying the tagging pane simultaneously on the same screen as the content pane may be utilized.

Figure 3B:
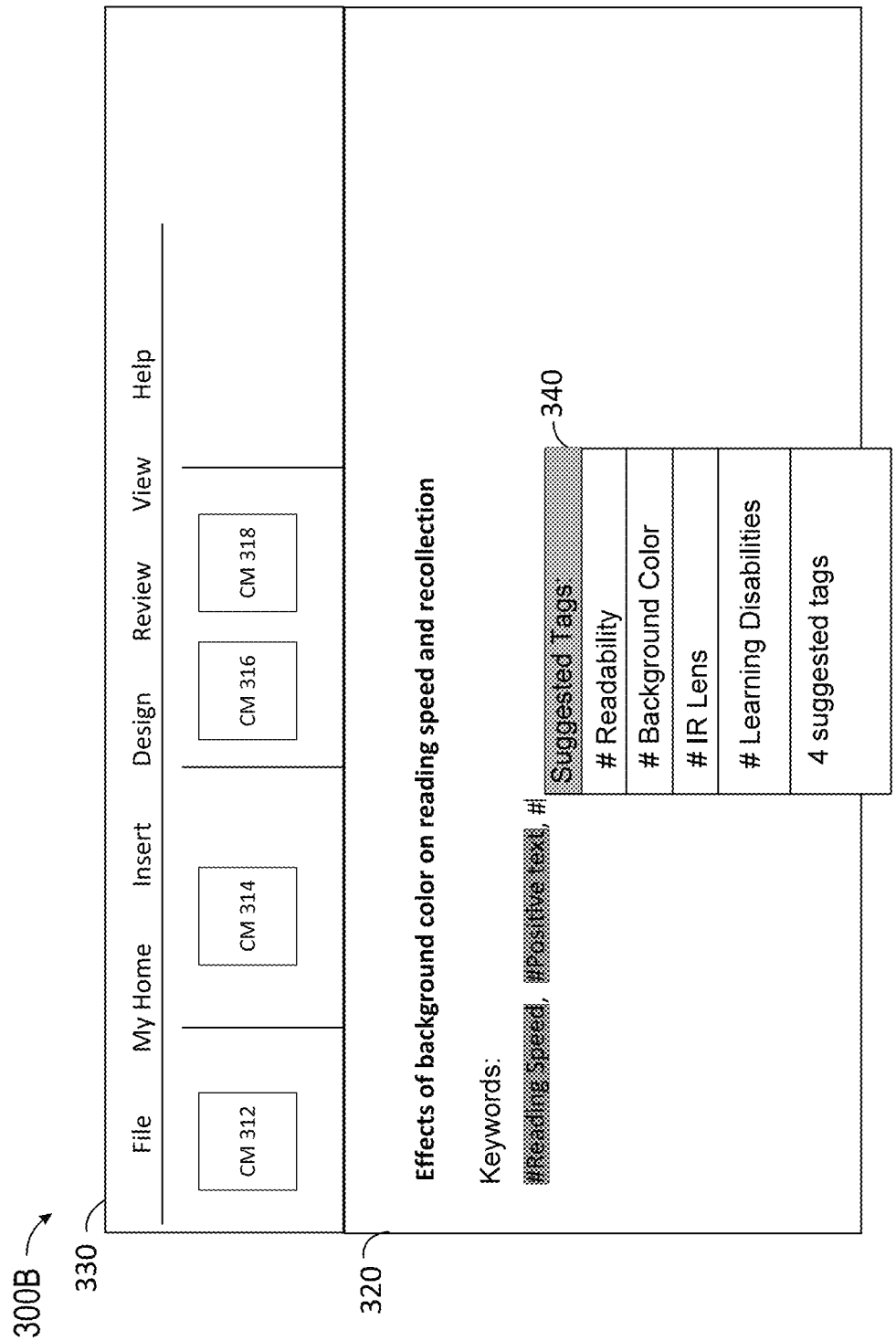

FIG. 3B is an example GUI screen 300B of an application providing an alternative manner in which suggested tags may be displayed. GUI screen 300B may include a toolbar menu 310 and a content pane 320 similar to those discussed with respect to FIG. 3A. GUI screen 300B, however, demonstrates that one or more shortcuts may be available to the user to utilize within the contents pane of a document to add tags to the document and/or facilitate display of suggested tags. For example, entering the hashtag character immediately before a phrase (e.g., with no spaces between the hashtag and the phrase) may turn the phrase into a tag for the document. This may automatically associate the phrase as a tag with the document. Other methods of easily adding tags to a document within the contents of the document may also be available. For example, entering the term "Tags:" may turn any phrases that follow the term into tags for the document. In one implementation, a comma may be used to separate the phrases intended to be utilized as tags. In one implementation, the special character or phrase used to turn text entered into the content pane into tags may need to be entered at specific locations within the document (e.g., at the end of the document, in a footnote, etc.). Alternatively, the special character or phrase may be entered anywhere in the document.

In addition to acting as a shortcut for adding user-entered tags to the document, the use of some special characters/phrases may also facilitate automatic display of a context menu 340 for suggested tags. For example, the context menu may be displayed upon the user entering the special character (e.g., a hashtag), as illustrated in screen 300B. In the example shown, entering the character hashtag causes the context menu to be displayed on the screen. In some examples, the context menu may be displayed by using specific keyboard shortcuts. Moreover, one or more of the command buttons CM 312, CM 314, CM 316, and CM 318 may be used to display the context menu 340. Alternatively, the context menu 340 may be displayed by right clicking on hashtag symbol.

Once displayed, each of the suggested tags in the pop-menu 340 may be selected to be added as a tag to the document. In one implementation, this involves simply clicking on a chosen keyword displayed in the context menu. For example, clicking on or otherwise selecting the keyword readability may add the phrase #Readability to the list of items displayed as tags and may associate the phrase readability as a tag for the document. Each selected tag may then be removed as a tag by simply deleting the phrase from the document. Although shown and discussed as a context menu, the list of suggested keywords may be presented in any other manner on the same screen as the content pane 320. For example, instead of a context menu, the list may be displayed in a separate pane of the screen, once the specific shortcut or phrase is entered.

Figure 3C:
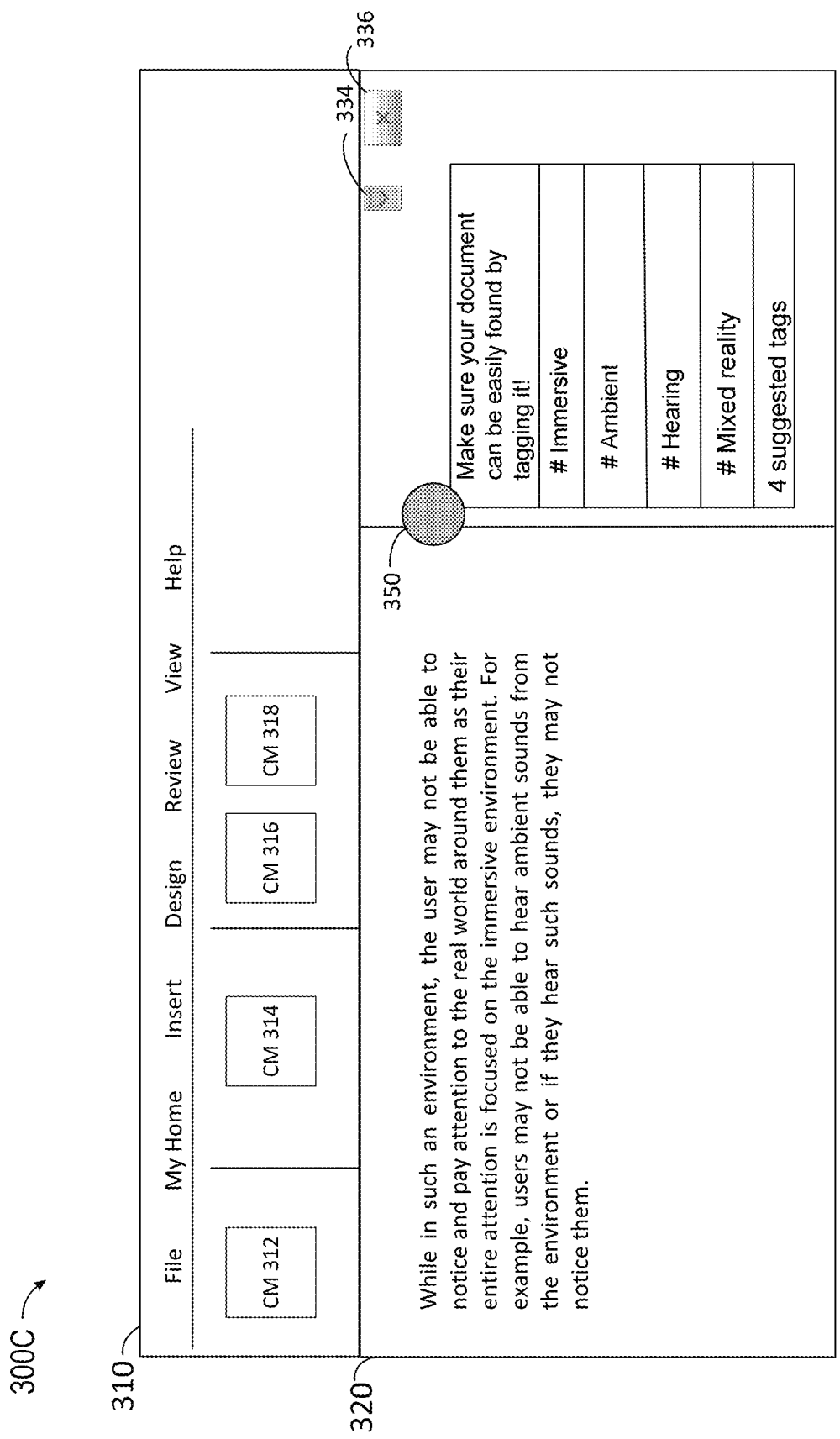

FIG. 3C is an example GUI screen 300C of an application providing an alternative manner in which suggested tags may be displayed. GUI screen 300B may include a toolbar menu 310 and a content pane 320 similar to those discussed with respect to FIGS. 3A-3B. However, in GUI screen 300C of FIG. 3C, instead of a tagging pane or a context menu, a tagging assistant 350 may be displayed alongside the content pane 320. The tagging assistant may operate as an application assistant designed to help users view and select suggested keywords as tags. The tagging assistant may include an explanation and a list of one or more suggested keywords. In one implementation, each of the suggested keywords may be selected by clicking on the box displaying the keyword. For example, clicking on or otherwise selecting the phrase # Immersive may add the keyword immersive as a tag associated with the document. The tagging assistant may be closed by selecting a button 334 and may reappear by selecting a drop-down button 330. In one implementation, the tagging assistant may be invoked upon on a determination made by the application that tagging is desired/needed for the document and/or that the tagging assistant would be the user's preferred method of displaying the suggested keywords. This may be determined by examining a usage history of the user (e.g., determining that the user often makes use of application assistants) or by examining user preselected preferences (e.g., the user selected an option to invoke the assistant for displaying tagging suggestions).

Figure 3D:
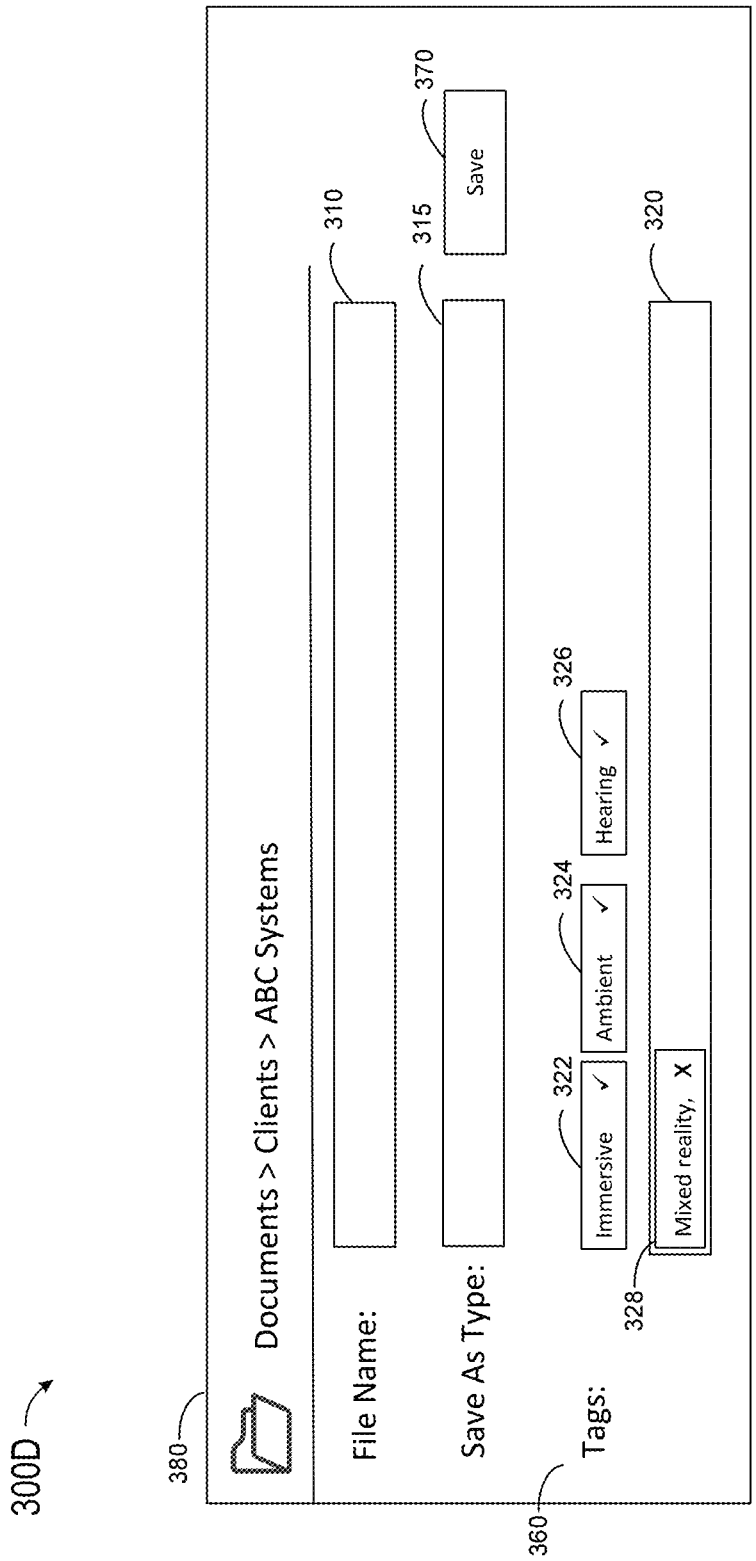

FIG. 3D is an example GUI screen 300D of an application providing yet another manner in which suggested tags may be displayed to the user. GUI screen 300D may be invoked when a save as option is selected for the document. This may provide an option for users that prefer to perform the tagging operation after the document is created or their desired changes are made. In some examples, the tagging features of GUI screen 300D may be displayed if the user fails to view and/or approve suggested keywords while viewing or editing the document. Alternatively, the tagging features may be displayed automatically as part of the save as option to provide another chance for approving suggested tags, modifying selected ones or adding new ones.

GUI screen 300D may include an input box 310 for entering a file name and an input box 315 for entering a type of file to store the document as. Additionally, GUI 300D include a tagging portion 360 for displaying suggested keywords such as keywords 322, 324 and 326, each of which may be approved by the user to be associated as a tag with the document by clicking for example on a checkmark displayed next to the keyword. Once approved, each keyword may be deselected by clicking on an x mark. Other user interface elements for displaying suggested keywords and enabling a user to approve/disapprove them may be utilized in alternative embodiments. Tagging portion 360 may also include an input box 320 into which the user may be able to enter user determined tags such as tag 328 for the document. This may enable the user to enter his/her own identified keywords to be associated with the document in addition or in place of the ones suggested by the application.

Once the desired keywords are selected and/or entered, the user may press the save button 370 to store the file at a location identified in the top portion 380. The stored file may include the contents of the document along with a metadata file wrapper which may contain the list of tags associated with the document. In one implementation, the list of tags may also be stored separately in a data store locally or at an enterprise or global level (depending on user permissions) to assist in improving intelligent tagging suggestions. The list of tags may be stored as an index table which associates each tag with one or more sections of the document. For example, if the document is created in phases and tags are added during each phase (e.g., during the first session pages 1-4 are created, while during the second session pages 5-8 are created), sections of the document created during each phase may be associated with the tags added during that session. In this manner, the process of identifying tags may not need to be repeated for sections created during previous sessions.

Figure 4:
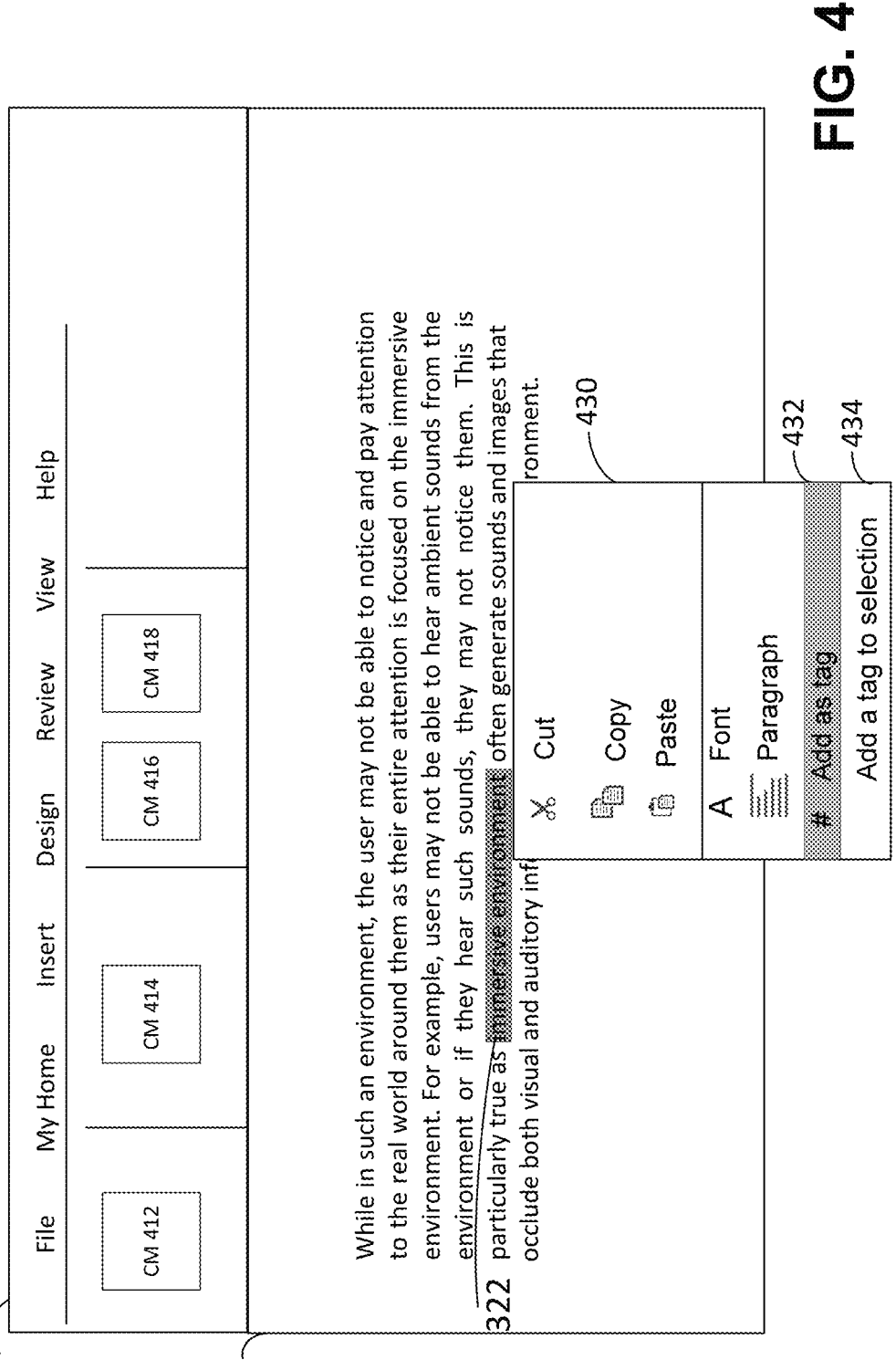
FIG. 4 is an example GUI screen displaying an option for adding a tag while in the document.

FIG. 4 is an example graphical user interface (GUI) screen 400 for displaying an option to add a tag while in the document. GUI screen 400 may include a toolbar menu 410 and a content pane 420 similar to the toolbar menu 310 and content pane 320 of FIGS. 3A-3C. However, instead of displaying suggested keywords to add as tags, GUI screen 400 depicts an option for adding a tag to the document as the user is working on/viewing the content pane. This may be performed by selecting a section of the document and subsequently invoking a context menu 430 which includes a menu option 432 for adding the selected section (e.g., highlighted phrase) as a tag and a menu option 434 for adding a keyword as a tag for the selected section. In this manner, the user can quickly add a word or phrase used in the content as a tag. This can be by for example right-clicking on the selected section. Alternatively, one of the command buttons CM 412, CM 414, CM 416 or CM 418 may be used to add a selected section as a tag. Other menu or user interface features may be utilized to quickly and efficiently add a selected section as a tag.

Utilizing the menu option 434 for adding a tag to a selected section may allow the user to specific which portions of the document a tag is associated with. This can result in producing more direct and relevant search results when tags are used to run searches. For example, instead of pointing to entire the document in the search results, a link may be provided to the particular section that relates to the added tag to pinpoint the exact information the tag relates to. When this option is utilized to add a tag to a particular section of a document, a pointer to the particular section may be stored along its associated tag in the tag index table when storing the document and/or its associated tagging metadata.

This may be done by examining the user and other users' usage history and currently activity to identify the current task and/or frequently used commands and then find other commands that are most closely related to the current task or to those frequently used commands. For example, if one of the user's most frequently performed activities has been to insert a table into a word processing document, the application may determine that table styles is most closely related to inserting tables and present an icon for that command to the user in the Suggested portion 130B. The relationships between various commands may be based on internal algorithms and models that link different commands and/or based on information from other users. For example, the application may examine data from other users with similar past activities and command usage to determine what commands they used in conjunctions with the user's frequently used commands or current task. This information may be used as one of the factors in deciding which commands to suggest to the user.

The data consulted may be from users within the same organization (e.g., same local network, same tenancy, etc.) or from users across multiple organizations. In one implementation, the system may identify users with similar application uses and/or similar roles or work functions within an organization or across multiple organizations and decide to use the history data of such similar users. In one implementation, the system may determine if similar users exist within the same organization and look outside of the organization when it cannot find a sufficient number of similar users within the organization. It should be noted that even though, data from users across multiple organizations may be used, the content of the data is anonymous and can in no way be traced back to the original user and/or organization. This guarantees the users' privacy, while enabling the method to utilize other users' data for the benefits of one another.

It should be noted that the user's prior history is not limited to usage history within the present application session and can span across multiple sessions. In one implementation, the usage history may include the entirety of the user's history of use of the application. Alternatively, the usage history may include the history for a specific period of time. Furthermore, usage history may include the history of other users. For example, it may include the history of other users with similar activities, similar work functions and/or similar work products. To enable examining the usage history outside of a current session, users' histories of activities may be stored in a database. In one implementation, the database may be stored in the cloud. As such, the history may be available even if the user uses the application on a different device. As long as the user is logged into or otherwise known to the application using a unique identification code, the history information may be accessed and used to personalize the application. Usage history may also be stored locally on the user's device. This may enable the command suggestions to also be personalized based on the specific device used. The device specific information may be useful in instances where the user performs different functions on different devices. In such cases, storing the user's history on each device separately may allow the method to provide personalized recommendations on each device.

Figure 5:
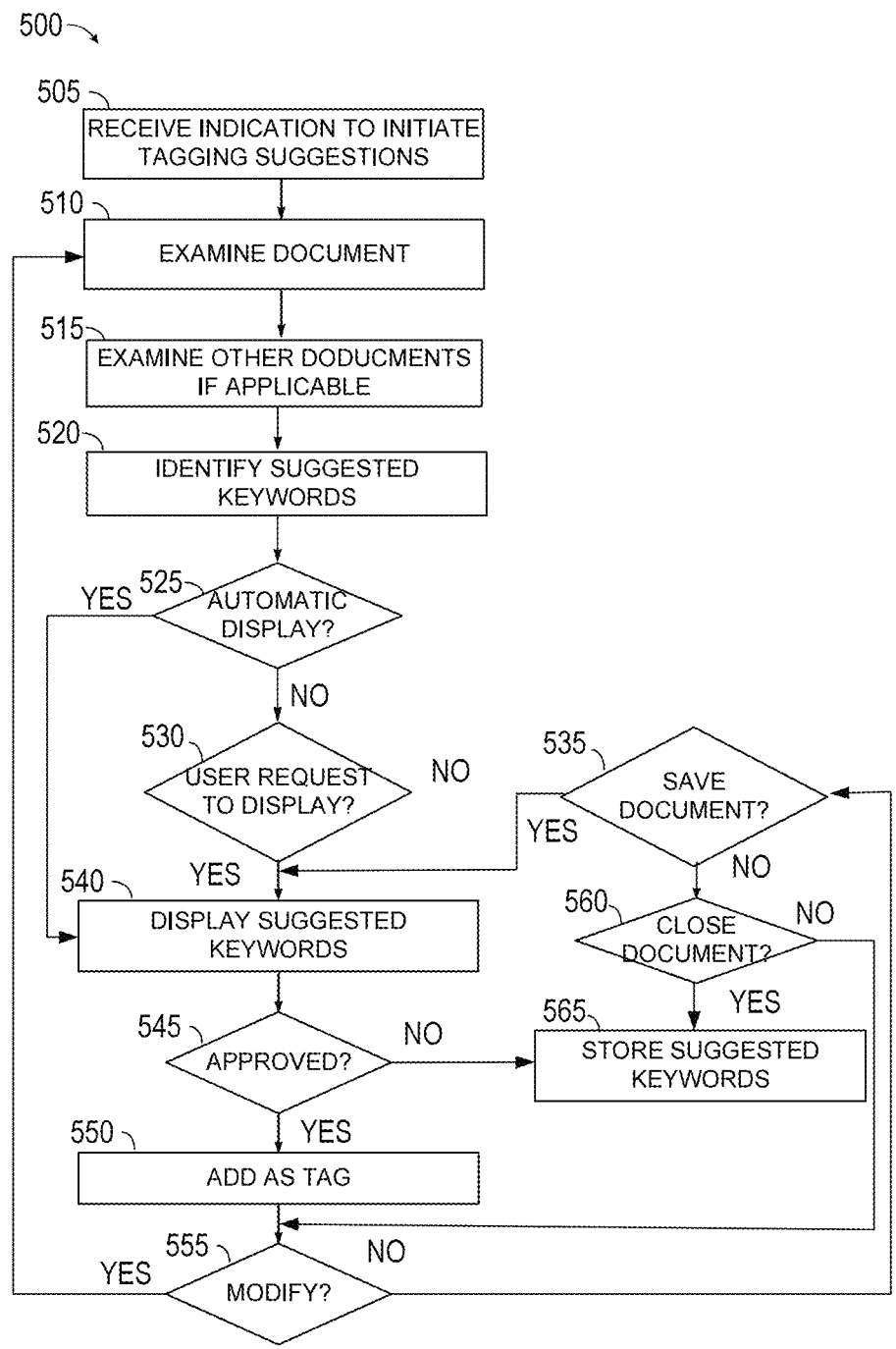
FIG. 5 is a flow diagram depicting an exemplary method for providing intelligent tagging suggestions to a user of a document.

FIG. 5 is a flow diagram depicting an exemplary method 500 for providing intelligent tagging suggestions to a user of a document to enable selection by the user. At 505, method 500 may begin by receiving an indication to initiate automatic tagging suggestions. This may occur, for example, when a document is first opened, and the application determines that automatic tagging suggestions are enabled for the document. Alternatively, the indication may be received when a user invokes a menu option, or any other UI element intended to initiate automatic tagging suggestions. In one implementation, receiving an indication may occur when a predetermined action takes place within the content pane (e.g., a special character is entered, or a predetermined keyboard shortcut is pressed). The indication may also involve the application receiving a request for refreshing a menu portion such as the tagging pane of FIG. 3A. In some examples, the indication may be received based on a predetermined or customizable schedule.

Once an indication to initiate the process is received, method 500 may proceed to first examine the document, at 510, to identify relevant keywords that may be used as tags for the document. This may be done by utilizing one or more text analytics algorithms that may examine the contents, context, formatting and/or other parameters of the document to identify relevant keywords.

The text analytics algorithms may include natural language processing algorithms that allow topic or keyword extractions, for example, in the areas of text classification and topic modeling. Examples of such algorithms include, but are not limited to, term frequency-inverse document frequency (TF-IDF) algorithms and latent Dirichlet allocation (LDA) algorithms. Topic modeling algorithms may examine the document to identify and extract salient words and items within the document that may be recognized as keywords. This may be done by looking for uniqueness in the structure and contents of the document.

Additionally, machine learning algorithms may be used to examine tagging and activity history of the user within the document or within the user's use of the application to identify patterns in the user's usage. For example, the types of keywords added by or approved by the user in a previous session of the document (or earlier in the current session) may be examined to identify patterns or topics of interest. In another example, keywords that have already been identified and not approved in a prior session (or earlier in the current session) may be eliminated from the list of identified keywords. This may be done during a prioritization and sorting process of the identified keywords. The history may be limited to the user's recent history (i.e., during a specific recent time period or during the current session) or may be for the entirety of the user's use of the application. This information may be stored locally and/or in the cloud. In one implementation, the history data may be stored locally temporarily and then transmitted in batches to a data store in the cloud which may store each user's data separately for an extended period of time or as long as the user continues using the application as long as the user has granted permission for such storage and use.

It should be noted that to perform the process of examining the document accurately, relevant portions of the document may first need to be identified. For example, if a portion of a document has previously been tagged, the same portion may not need to be examined again. Furthermore, if the request for tagging relates to a subsection, only the subsection may need to be examined.

In addition to the content and history of the current document, other documents may also be examined, at 515. For example, content, context and formatting of other documents authored, edited or frequently viewed by the user may also be examined to identify patterns and preferences. In one implementation, tagging history and content data extracted from other users determined to be in a same category as the current user (e.g., in the same department, having the same job title, etc. or being part of the same organization) may also being examined at this stage. Furthermore, method 500 may consult a global database of user tagging history and document contents to identify global patterns. In one implementation, in consulting the global database, the method identifies and uses data for users that are in a similar category as the current user. For example, the method may use history data from users with similar activities, similar work functions and/or similar work products. The database consulted may be global but also local to the current device. The process of examining other documents to identify relevant tags may be performed by text analytics algorithms such as a text classification algorithm. Text Classification algorithms may allow the method to utilize a corpus of tagged documents to suggest new tags for documents having similar characteristics. Text classification may rely on existing tagged documents to generate tags.

After examining the current document and other documents, a list of relevant keywords to suggest as tags may be identified, at 520. To determine how to prioritize and sort the list of identified keywords, tagging history of the document and/or the user may be again examined. For example, the user's tagging activities such as approved tags of the current or past documents (e.g., documents similar in topic or formatting to the current document) and/or directly added tags of the current or past documents may be examined. Furthermore, enterprise preferences may be examined here or when identifying the keywords to identify the best keywords and determine how to prioritize them. In one example, an administer may add a list of enterprise keywords as predetermined basic tagsonomy for the enterprise. These may be keywords that are specific to the enterprise and commonly used to identify products, departments, company goals, etc. These keywords may be given priority over other keywords identified in the document. The order of priorities may be used to determine the order in which to display the keywords. The order of priority may depend on a number of factors such as, the degree of useful and relevance.

In one implementation, identifying relevant keywords made done by utilizing two or more different types of models. One type could be a personal model which is trained based on each user's personal information and another could be a global model that is trained based on examination of a global set of other users' information. A hybrid model may be used to examine users similar to the current user and to generate results based on activities that other users utilizing similar commands as the current user use. For example, it may examine users that create similar artifacts as the current user or create documents having similar topics. Any of the models may store what is suggested and record how the user interacts with the suggestions (e.g., which suggestions they approve). This ensures that every time a user interacts with the system, the models learn from the interaction to make the suggestions better. The different models may be made aware of each other, so that they each benefit from what the other models are identifying, while focusing on a specific aspect of the task.

It should be noted that the models examining the contents and identifying keywords may be hosted locally on the client (e.g., local tagging engine) or remotely in the cloud (e.g., tagging service). In one implementation, some models are hosted locally, while others are stored in the cloud. This enables the client to provide some suggestions even when the client is not connected to a network. For example, the client may be able to provide a list of keyword suggestions based on the current document and other local documents), but it may not be able to provide suggestions based on other users. Once the client connects to the network, however, the application may be able to provide better and more complete suggestions.

Once the list of relevant keywords is identified and prioritized, method 600 may proceed to determine if the list should be automatically displayed on the UI screen for example as part of tagging pane, at 525. This determination may depend on the user's preferences (e.g., options selected) or may be made based on one or more activities of the user (e.g., past tagging history). If it is determined, at 525, that the suggestions should be displayed, method 600 may proceed to step 540 to display the suggested keywords. This involve displaying the suggestions alongside the content pane. When it is determined, at 525, that the list should not be automatically displayed (e.g., when a user has closed the tagging pane), method 500 may proceed to determine if a user request to display the suggestions has been received, at 530. This may occur by receiving a user input invoking a menu option (an option as part of a context menu such as context menu 430 of FIG. 4) or special characters associated with display of tagging suggestions (e.g., entering a hashtag or pressing specific keyboard shortcuts) and the like.

When it is determined that a user request to display the suggestions has been received, method 500 may proceed to display the suggestions, at 540. The format in which the suggestions are displayed may depend on the type of user request received (e.g., from a context menu, by invoking special characters, etc.). However, in most cases, the suggestions may be displayed alongside the contents to enable easy reference to the contents.

Once the suggestions are displayed, method 500 may determine if any of the suggested keywords are approved by the user to be added as tags, at 545. This may occur by receiving user input indicating approval of a tag (e.g., pressing a checkmark next to a suggestion). If it is determined that at least one suggestion has been approved, then method 500 may proceed to add the suggestion as a tag to the document, at 550, by for example by storing the suggestion in a tag index table. After the approved keywords are added to the list of tags for the document, method 500 may determine if any further modifications are made to the document, at 555. For example, the method may determine if a new paragraph or a new page of content has been added or a previous section was modified to add or remove certain words. When it is determined that modifications have been made since the last list of suggestions was identified, method 500 may return to step 510 to reexamine the document and determine if any new keywords can be identified as outlined above. In one implementation, this may occur based on a predetermined schedule. For example, when a document is open, the process of checking to determine if modifications have been made may occur based on a predetermined or customizable schedule (e.g., every 30 minutes.).

When it is determined at no modifications have been made at 555 and when it is determined that no user request to display the suggestions has been received at 530, method 500 may proceed to determine if a request to save the document has been received, at 535. In one implementation, when a request to save the document is received, a menu (e.g., pop-up menu) may appear on the screen which may include the list of suggested keywords. Alternatively, the request to save the document may be a request to save the document as a particular file. In such cases, method 500 may return to step 540 to display the suggested keywords. In this instant, the suggested keywords may be displayed as part of the save as or save menu, before method 500 proceeds to determine if any of the suggested words are approved as discussed above.

When a request to save the document has not been received, method 500 may proceed to determine if a request to close the document has been received, at 560, in which case it may proceed to store the suggested keywords in a list of suggested keywords (e.g., an index table of suggested keywords) so the process of identifying keywords may not need to be repeated the next time the document is opened. Instead the same suggested keywords may be displayed again when the document is opened or when a request to display suggested keywords is received in a later session. Alternatively, a pointer may be stored in the tag index table to identify the location the sections of the document that were examined, so that when a request for displaying tagging suggestions is received in a later session, those sections need not to be examined again.

When it is determined, at 560, that a request to close the document has not been received, method 500 may return to step 555 to determine if any new modifications have been made, as discussed above.

Thus, the methods for providing intelligent tagging suggestions to a user of a document are disclosed. The methods may utilize the user's personal tagging pattern and other users' tagging patterns identify relevant keywords. The keywords may then be displayed on the same UI screen as the document content to enable the user to quickly and efficiently approve the most appropriate keywords as tags for the document. This provides an easy and efficient mechanism for enabling users to select their own tags for their documents. This can improve the user's overall experience, increase their efficiency, and assist in locating relevant documents more easily when needed.

As a general matter, the methods and systems described herein may include, or otherwise make use of, a machine-trained model to identify relevant keywords to use as tagging suggestions. As an example, a system can be trained using data generated by machine learning (ML) model in order to identify patterns in user activity, determine associations between various words and topics, and/or identify suggested keywords for a given user. Such determination may be made following the accumulation, review, and/or analysis of tagging history data from a large number of users over time, that may be configured to provide the ML algorithm (MLA) with an initial or ongoing training set. As a general example, a number of tag approvals used to serve as a baseline for training can range from 20 to over 1,000, 000. In addition, in some implementations, a user device can be configured to transmit data captured locally during use of the relevant application(s) to the cloud or the local ML program and provide supplemental training data that can serve to fine-tune or increase the effectiveness of the MLA. The supplemental data can also be used to facilitate identification of keywords and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, a size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

In some implementations, the ML models and/or their corresponding classification systems can be configured to use, among other things, machine learning and inference techniques to patterns in user activity, determine associations between various words and topics, and/or identify relevant keywords based on data collected during use of the system. In some implementations, machine learning techniques may generate one or more models for identifying and/or characterizing events based on a corpus of training data in the form of labeled or otherwise previously characterized data. Furthermore, the training data may be continually updated and one or more of the models used by the classification system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

Various ML algorithms and techniques for training ML models are discussed in U.S. Patent Application Publication Numbers 2013/0346346 (published on Dec. 26, 2013 and entitled "Semi-Supervised Random Decision Forests for Machine Learning"), 2014/0122381 (published on May 1, 2014 and entitled "Decision Tree Training in Machine Learning"), 2014/0172753 (published on Jun. 19, 2014 and entitled "Resource Allocation for Machine Learning"), 2015/0248764 (published on Sep. 3, 2015 and entitled "Depth Sensing Using an Infrared Camera"), 2015/0248765 (published on Sep. 3, 2015 and entitled "Depth Sensing Using an RGB Camera"), 2017/0132496 (published on May 11, 2017 and entitled "Hardware-Efficient Deep Convolutional Neural Networks"), 2017/0206431 (published on Jul. 20, 2017 and entitled "Object Detection and Classification in Images"), 2017/0236286 (published on Aug. 17, 2017 and entitled "Determining Depth from Structured Light Using Trained Classifiers"), U.S. patent application Ser. No. 15/870,783 (filed on Jan. 12, 2018 and entitled "Automated Collection of Machine Learning Data"), and 2017/0262768 (published on Sep. 14, 2017 and entitled "Depth from Time-of-Flight Using Machine Learning"), which are each incorporated by reference herein in their entireties.

Thus, in different implementations, a machine learning model can be developed that is configured to identify with high confidence and precision application keywords a user may deem relevant to their documents. In some implementations, the ML model can obtain reinforcement signals to improve the model and better account for user intentions. As a preliminary modeling paradigm, some implementations can make use of one or more bootstrapping algorithms to provide approximations of these predictions.

Figure 6:
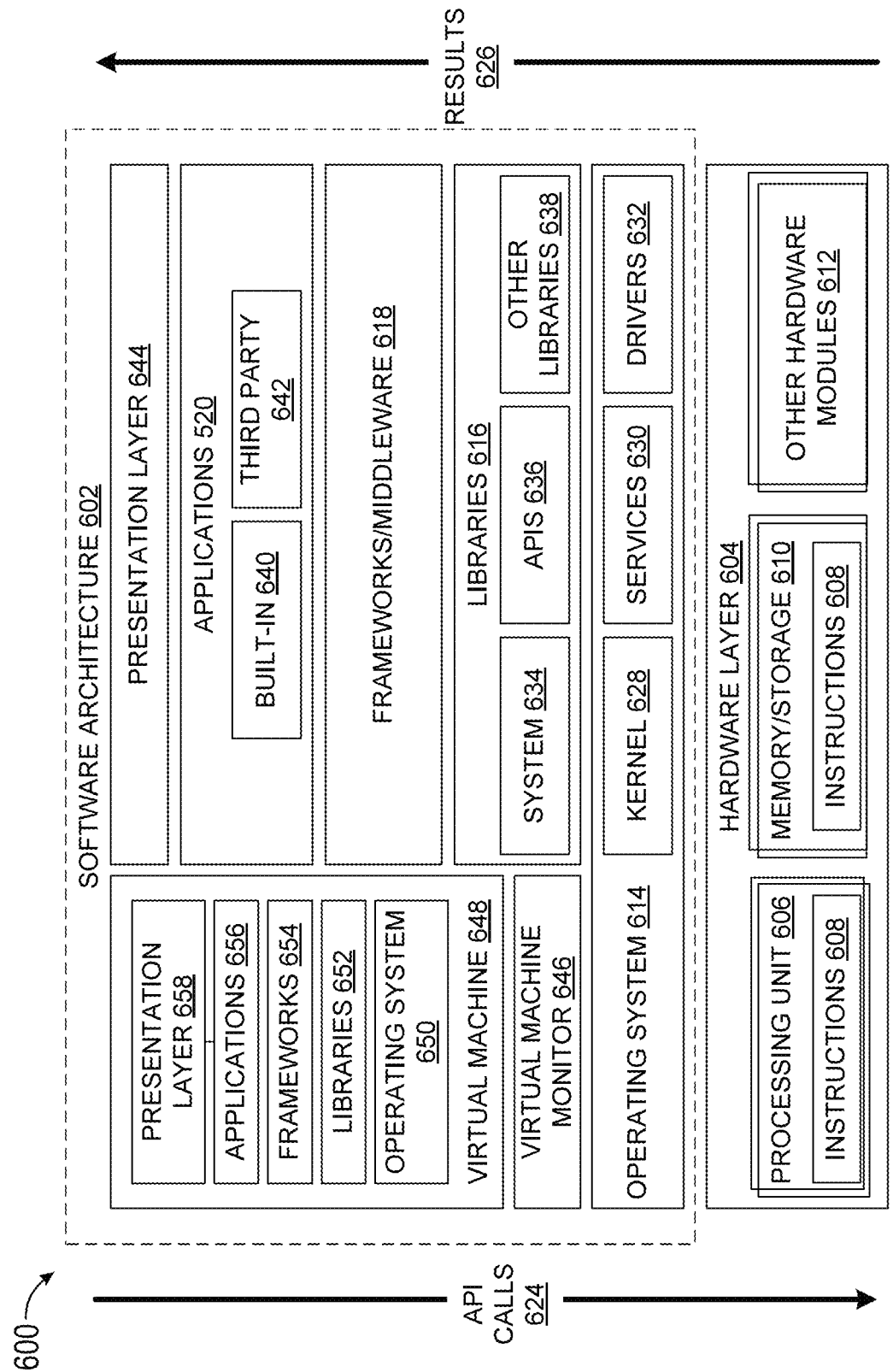
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 624. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 620 and/or third-party applications 622. Examples of built-in applications 620 may include, but are not limited to, a contacts application, a browser application, a location application, a media application, a messaging application, and/or a game application. Third-party applications 622 may include any applications developed by an entity other than the vendor of the particular system. The applications 620 may use functions available via OS 614, libraries 616, frameworks 618, and presentation layer 624 to create user interfaces to interact with users.

Some software architectures use virtual machines, as illustrated by a virtual machine 628. The virtual machine 628 provides an execution environment where applications/modules can execute as if they were executing on a hardware machine (such as the machine 600 of FIG. 6, for example). The virtual machine 628 may be hosted by a host OS (for example, OS 614) or hypervisor, and may have a virtual machine monitor 626 which manages operation of the virtual machine 628 and interoperation with the host operating system. A software architecture, which may be different from software architecture 602 outside of the virtual machine, executes within the virtual machine 628 such as an OS 650, libraries 652, frameworks 654, applications 656, and/or a presentation layer 658.

Figure 7:
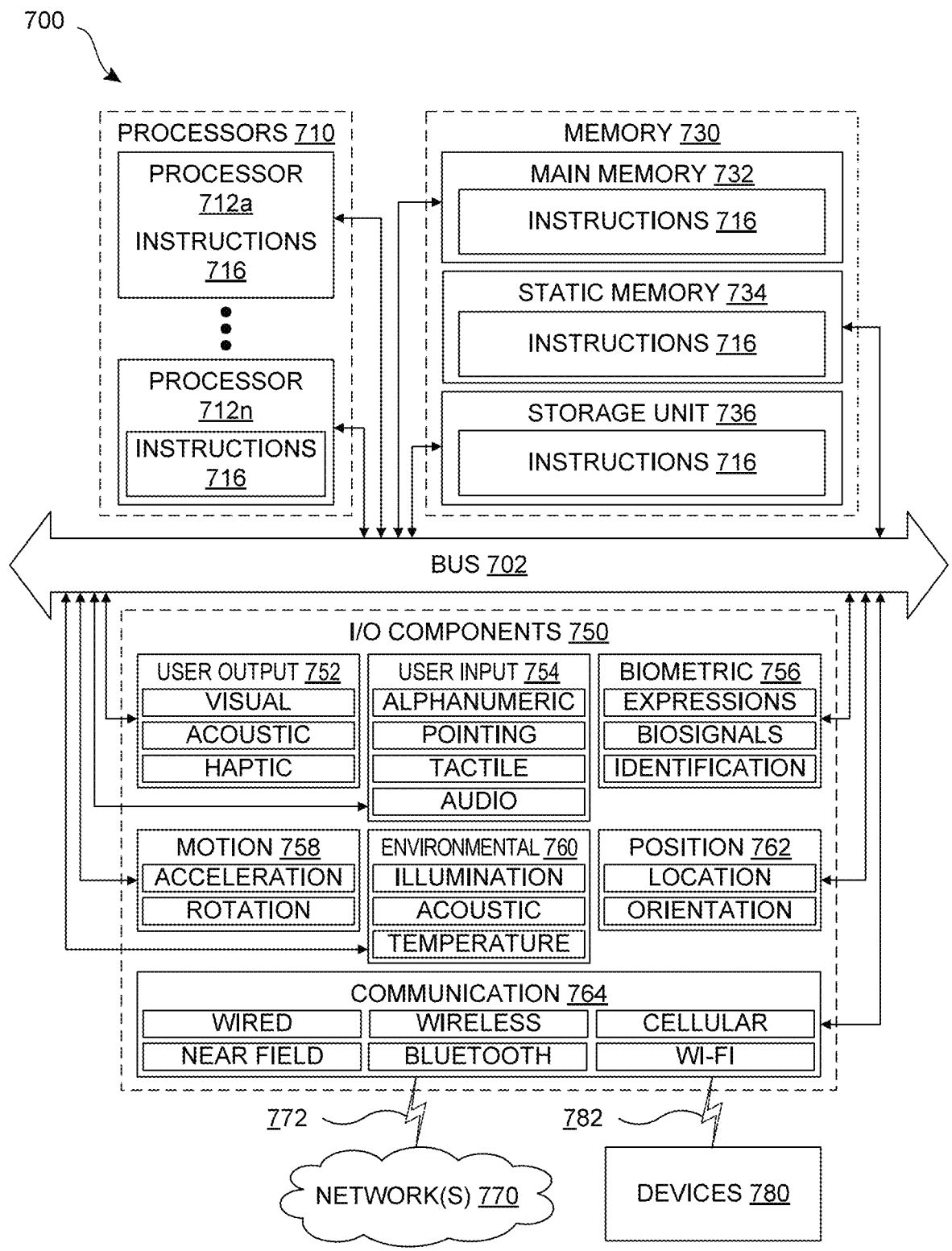
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device comprising:
a processor; and
a memory in communication with the processor, the memory comprising executable instructions that, when executed by, the processor, cause the device to perform functions of:
receiving a request to save a document;
upon receiving the request to save the document, examining contents of the document;
examining a tagging history of a user of the document, the tagging history being stored in a database in the memory or stored in a database in a network storage device;
identifying a section of the document that needs to be associated with a tag;
identifying a keyword related to the identified section based at least on one of the contents of the document and the tagging history of the user;
displaying the keyword on a user interface element relating to saving the document to enable the user to choose to add the keyword as a tag associated with the document, when saving the document;
receiving an input indicating a user's approval of the keyword;
upon receiving the input, associating the keyword with the document as the tag; and
saving the document and storing the keyword as being associated with the document as the tag.

2. The device of claim 1, wherein the instructions further cause the processor to cause the device to perform functions of:
examining a tag history of the document;
examining a tag history of one or more other documents; and
identifying the keyword related to the identified section based at least on one of the contents of the document, the tag history of the document, the tagging history of the user, and the tag history of the one or more other documents.

3. The device of claim 1, wherein the user interface element relating to the document comprises a menu for saving the document.

4. The device of claim 1, wherein associating the keyword with the document as the tag comprises adding the keyword to a tag index table.

5. The device of claim 1, wherein the instructions further cause the processor to cause the device to perform a function of enabling the user to enter a keyword to be associated with the document as the tag.

6. A method for providing tag suggestions for a document to a user of the document during use of the document, comprising:
receiving a request to save the document;
upon receiving the request to save the document, examining contents of the document;
examining contents of the document;
examining a tagging history of the user of the document, the tagging history being stored in a database in a memory or stored in a database in a network storage device;
identifying a section of the document that needs to be associated with a tag;
identifying a keyword related to the identified section based at least on one of the contents of the document and the tagging history of the user;
displaying the keyword on a user interface element relating to saving the document to enable the user to choose to add the keyword as a tag associated with the document, when saving the document;
receiving an input indicating a user's approval of the keyword;
upon receiving the input, associating the keyword with the document as the tag; and saving the document and storing the keyword as being associated with the document as the tag.

7. The method of claim 6, further comprising:
examining a tag history of the document;
examining a tag history of one or more other documents; and
identifying the keyword related to the identified section based at least on one of the contents of the document, the tag history of the document, the tagging history of the user, and the tag history of the one or more other documents.

8. The method of claim 6, wherein the user interface element relating to the document comprises a menu for saving the document.

9. The method of claim 6, wherein associating the keyword with the document as the tag comprises adding the keyword to a tag index table.

10. The method of claim 6, further comprising enabling the user to enter a keyword to be associated with the document as the tag.

11. A non-transitory computer readable medium on which are stored instructions that, when executed, cause a programmable device to:
 receive a request to save a document;
 upon receiving the request to save the document, examine contents of the document;
 examine a tagging history of a user of the document, the tagging history being stored in a database in a memory or stored in a database in a network storage device;
 identify a section of the document that needs to be associated with a tag;
 identify a keyword related to the identified section based at least in part on the contents of the document and the tagging history of the user;
 display the keyword on a user interface element relating to saving the document to enable the user to choose to add the keyword as a tag associated with the document, when saving the document;
 receive an input indicating a user's approval of the keyword;
 upon receiving the input, associate the keyword with the document as the tag; and
 saving the document and storing the keyword as being associated with the document as the tag.

12. The non-transitory computer readable medium of claim 11, wherein the instructions further cause the programmable device to:
 examine a tag history of the document;
 examine a tag history of one or more other documents; and
 identify the keyword related to the identified section based at least on one of the contents of the document, the tag history of the document, the tagging history of the user, and the tag history of the one or more other documents.

13. The non-transitory computer readable medium of claim 11, wherein the user interface element relating to the document comprises a menu for saving the document.

14. The non-transitory computer readable medium of claim 11, wherein associating the keyword with the document as the tag comprises adding the keyword to a tag index table.

15. The non-transitory computer readable medium of claim 11, wherein the instructions further cause the programmable device to enable the user to enter a keyword to be associated with the document as the tag.

16. The device of claim 1, wherein identifying the section of the document includes:
 identifying a new section of the document that has been added since the document was last associated with the tag, or
 identifying a previously created section of the document that has been modified since the document was last associated with the tag, and
 by identifying the section of the document, identifying keywords related to the document is not repeated for sections created during one or more previous sessions.

* * * * *